(12) United States Patent
Sugg

(10) Patent No.: US 10,527,087 B2
(45) Date of Patent: Jan. 7, 2020

(54) SOCKET ASSEMBLY AND METHOD OF MAKING

(71) Applicant: Federal-Mogul Motorparts LLC, Southfield, MI (US)

(72) Inventor: Brennan Sugg, Maplewood, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 218 days.

(21) Appl. No.: 15/673,127

(22) Filed: Aug. 9, 2017

(65) Prior Publication Data

US 2019/0048922 A1     Feb. 14, 2019

(51) Int. Cl.
*F16C 11/06*     (2006.01)
*F16C 11/08*     (2006.01)

(52) U.S. Cl.
CPC .......... *F16C 11/0633* (2013.01); *F16C 11/06* (2013.01); *F16C 11/0671* (2013.01); *F16C 11/0614* (2013.01); *F16C 11/083* (2013.01); *F16C 2226/70* (2013.01); *F16C 2326/05* (2013.01); *F16C 2326/24* (2013.01)

(58) Field of Classification Search
CPC ..... Y10T 403/32729; Y10T 403/32737; Y10T 403/32721; Y10T 403/32745; Y10T 403/32631; F16C 11/0671; F16C 11/0685
See application file for complete search history.

(56) References Cited

U.S. PATENT DOCUMENTS

| 3,027,182 A | 3/1962 | Reuter |
| 3,216,754 A | 11/1965 | Smith et al. |
| 3,273,923 A * | 9/1966 | Ulderup ................. F16C 11/06 403/134 |
| 3,378,287 A * | 4/1968 | Ulderup .............. F16C 11/0614 384/138 |
| 3,389,927 A | 6/1968 | Herbenar |
| 3,547,474 A | 12/1970 | Colletti et al. |

(Continued)

FOREIGN PATENT DOCUMENTS

| DE | 20216045 U1 | 3/2004 |
| GB | 886571 A | 1/1962 |
| JP | 2010203459 A | 9/2010 |

OTHER PUBLICATIONS

International Search Report, dated Oct. 11, 2018 (PCT/US2018/045723).

*Primary Examiner* — Michael P Ferguson
(74) *Attorney, Agent, or Firm* — Robert L. Stearns; Dickinson Wright, PLLC

(57) ABSTRACT

The socket assembly includes a housing with an inner surface that surrounds an inner bore which extends along a central axis. An elastomeric boot extends between first and second boot ends and is sealed with the housing and a shank portion of the stud. The first boot end is received in the inner bore of the housing. An insert, which is fabricated as a separate piece from the boot, is received in the inner bore of the housing. The insert has an outer periphery which presents a plurality of radial teeth that are spaced from one another in a circumferential direction. The teeth are angled at an acute angle relative to the central axis and compress portions of the elastomeric material of the first boot end of the boot to improve the seal between the first boot end of the boot and the inner surface of the housing.

11 Claims, 5 Drawing Sheets

(56) References Cited

U.S. PATENT DOCUMENTS

| | | | | |
|---|---|---|---|---|
| 3,650,004 | A | * 3/1972 | Bergstrom | F16C 11/06 29/402.18 |
| 5,066,159 | A | * 11/1991 | Urbach | F16C 11/0666 277/635 |
| 6,042,294 | A | * 3/2000 | Urbach | F16C 11/0647 403/135 |
| 6,530,711 | B2 | 3/2003 | Menotti | |
| 8,714,862 | B2 | 5/2014 | Mevorach et al. | |
| 8,851,785 | B1 | * 10/2014 | Belleau | F16C 11/0671 403/122 |
| 9,291,195 | B1 | 3/2016 | Parker et al. | |
| 9,296,271 | B2 | 3/2016 | Mevorach et al. | |
| 2006/0182491 | A1 | * 8/2006 | Bernhardt | F16C 11/0671 403/134 |
| 2009/0209353 | A1 | * 8/2009 | Abels | F16C 11/0671 464/106 |
| 2016/0025129 | A1 | 1/2016 | Parker et al. | |

\* cited by examiner

SOCKET ASSEMBLY AND METHOD OF MAKING

BACKGROUND OF THE INVENTION

1. Field of the Invention

The present invention is related, generally, to socket assemblies and, more particularly, to socket assemblies with a boot that is sealed with a housing and a shank portion of a stud.

2. Related Art

Vehicle steering and suspension systems typically include a plurality of ball socket assemblies to connect a knuckle with a tie rod and with one or more control arms. Each socket assembly includes a housing and a ball stud that are configured to rotate and articulate relative to one another during operation of the vehicle. The ball stud has a ball portion, which is received in an inner bore of the housing, and a shank portion that projects out of the inner bore through an open end of the housing. An elastomeric boot is in fluid-tight sealing engagement with both the housing and the shank portion of the ball stud to retain a lubricant (such as grease) within the inner bore of the housing and to prevent contaminants (such as water, dirt or salt) from entering the inner bore. In some socket assemblies, the elastomeric boot is sealed against an outer surface of the housing and in others, one end of the elastomeric boot is received into the inner bore and is sealed against an inner surface of the housing.

There remains a continuing need to improve the fluid-tight seal between the elastomeric boot and the housing in a cost effective and robust manner.

SUMMARY OF THE INVENTION AND ADVANTAGES

One aspect of the present invention is related to a socket assembly. The socket assembly includes a housing with an inner surface that surrounds an inner bore which extends along a central axis. A stud is partially received in the inner bore of the housing and includes a shank portion which extends out of the inner bore through an open end of the housing. The socket assembly further includes a boot, which is made of an elastomeric material, that extends from a first boot end that is sealed with the housing to a second boot end that is sealed with the shank portion of the stud. The first boot end is received in the inner bore and is sealed with the inner surface of the housing. An insert, which is fabricated as a separate piece from the boot, is received in the inner bore of the housing. The insert has an outer periphery which presents a plurality of teeth that extend radially outwardly and are spaced from one another in a circumferential direction. The teeth are angled at an acute angle relative to the central axis and compress portions of the elastomeric material of the first boot end of the boot to improve the seal between the first boot end of the boot and the inner surface of the housing.

According to another aspect of the present invention, the insert further includes a generally planar base portion, and the plurality of teeth extend radially outwardly from the base portion. The teeth are angled relative to the base portion.

According to yet another aspect of the present invention, all of the teeth of the insert are angled relative to the planar base portion.

According to still another aspect of the present invention, the insert has an opening, and the shank portion of the stud extends through the opening.

According to a further aspect of the present invention, the opening is generally rectangular, elliptical or round in shape.

According to yet a further aspect of the present invention, at least one bearing is disposed in the inner bore of the housing and is in slidable contact with the stud to allow the stud to articulate or rotate relative to the housing.

According to still a further aspect of the present invention, the insert is compressed to bias the planar base portion against the bearing to bias the bearing against the stud.

According to a further aspect of the present invention, the stud is a ball portion with a ball portion that is disposed in the inner bore of the housing.

Another aspect of the present invention is related to a method of making a socket assembly. The method includes the step of preparing a housing with an inner surface that surrounds an inner bore which extends along a central axis. The method continues with the step of inserting a portion of the stud into the inner bore of the housing such that a shank portion of the stud extends out of the inner bore. The method proceeds with the step of inserting a first boot end of an elastomeric boot into the inner bore of the housing. The method continues with the step of sealing the first boot end of the elastomeric boot with the housing. The method proceeds with the step of sealing a second boot end of the elastomeric boot against the shank portion of the stud. The method continues with the step of inserting an insert into the inner bore of the housing, the insert having an outer periphery which presents a plurality of teeth that are spaced from one another in a circumferential direction. The method proceeds with the step of compressing parts of the first boot end of the elastomeric boot with the teeth of the insert to improve the steal between the first boot end of the elastomeric boot and the housing.

According to another aspect of the present invention, the insert further includes a generally planar base portion, and the plurality of teeth extend radially outwardly from the planar base portion and are angled relative to the planar base portion.

According to yet another aspect of the present invention, the first boot end of the elastomeric boot presents a radially outwardly extending flange, the inner surface of the housing presents a radially inwardly extending lip, and the radially outwardly extending flange of the elastomeric boot is in direct, surface-to-surface contact with the radially inwardly extending lip.

According to still another aspect of the present invention, all of the teeth are angled relative to the planar base portion.

According to a further aspect of the present invention, the method further includes the step of inserting a bearing into the open bore of the housing and into surface-to-surface contact with a portion of the stud.

According to yet a further aspect of the present invention, the method further includes the step of elastically deforming the insert to impart a biasing force on the bearing to bias the bearing against the stud.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
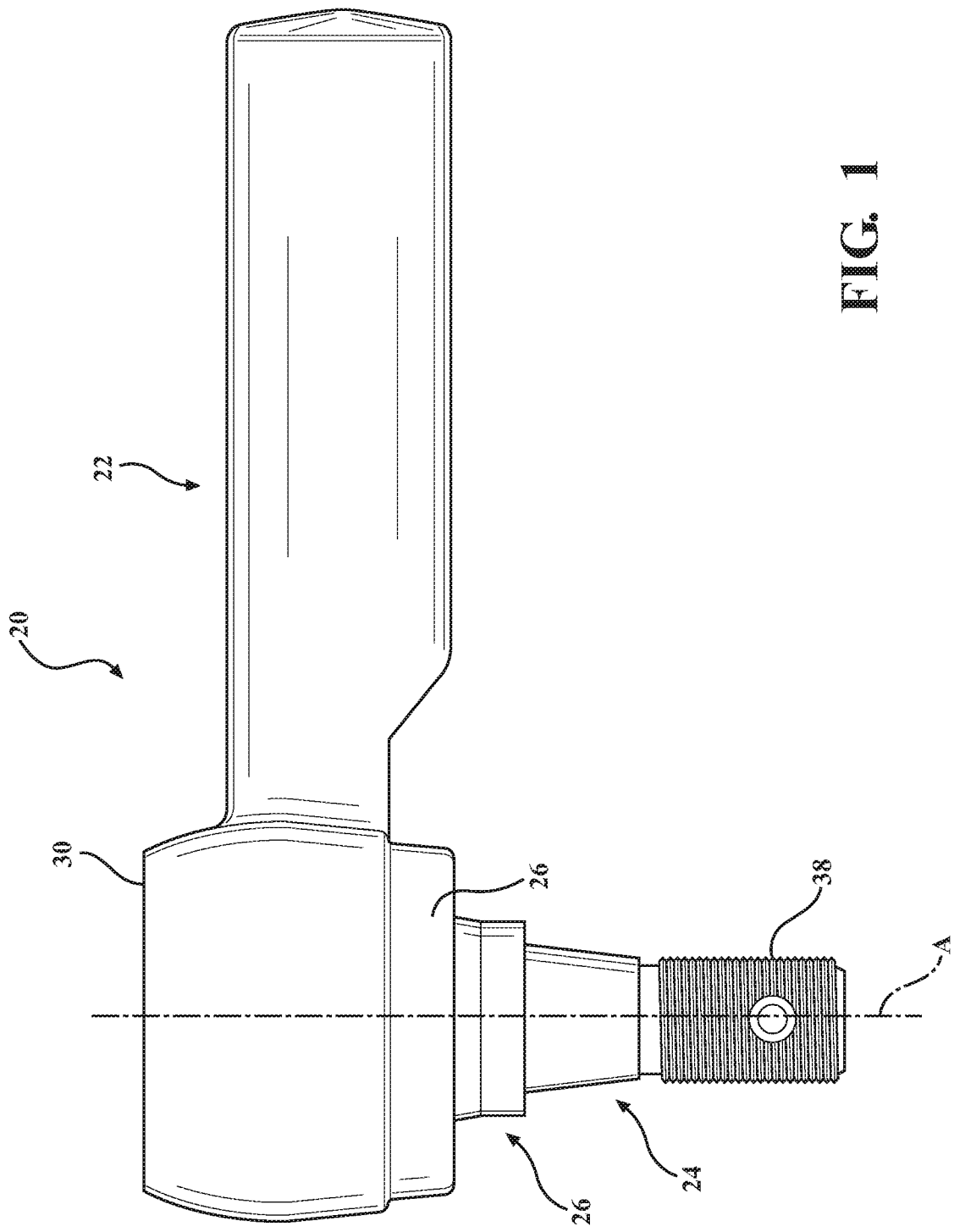
FIG. 1 is an elevation view of an exemplary embodiment of an improved socket assembly constructed according to one aspect of the present invention.
Figure 2:
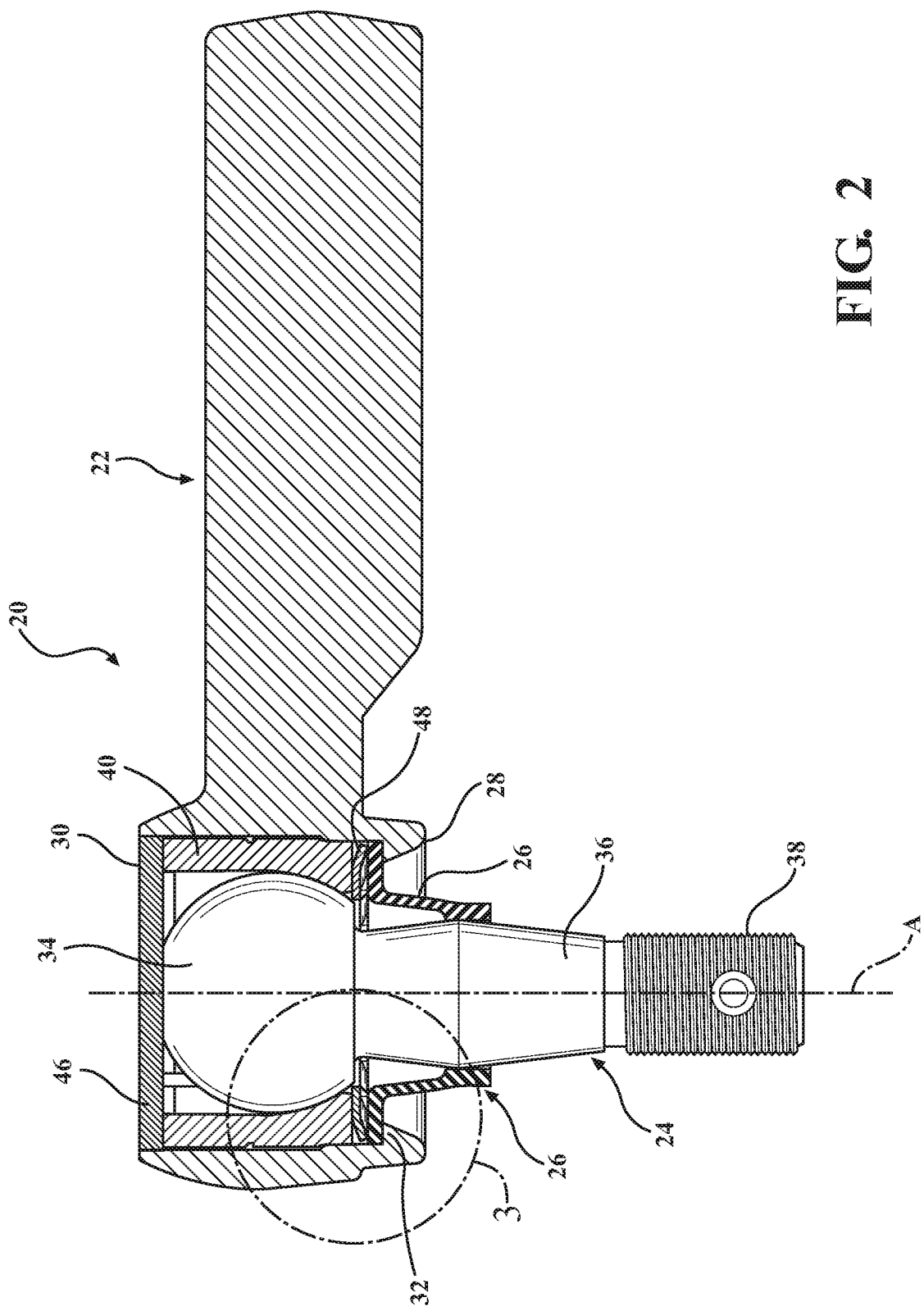
FIG. 2 is a cross-sectional view of the socket assembly of FIG. 1.

Referring to the Figures, wherein like numerals indicate corresponding parts throughout the several views, an exemplary embodiment of an improved socket assembly 20 is generally shown in FIGS. 1 and 2. The socket assembly 20 includes a housing 22 and a ball stud 24, which in operation, can freely rotate and articulate relative to one another. A boot 26 is in a fluid-tight sealing engagement with each of the housing 22 and the ball stud 24. As the ball stud 24 and the housing 22 rotate and articulate relative to one another, the boot 26 flexes elastically to maintain the fluid-tight sealing engagements with the housing 22 and the ball stud 24. In the exemplary embodiment, the socket assembly 20 is a tie rod end for operably connecting a tie rod (not shown) with a steering knuckle (not shown) of a vehicle steering and suspension system. However, it should be appreciated that the socket assembly could be configured to attach a control arm (not shown) with the knuckle or for a range of other automotive and non-automotive purposes.

Figure 5:
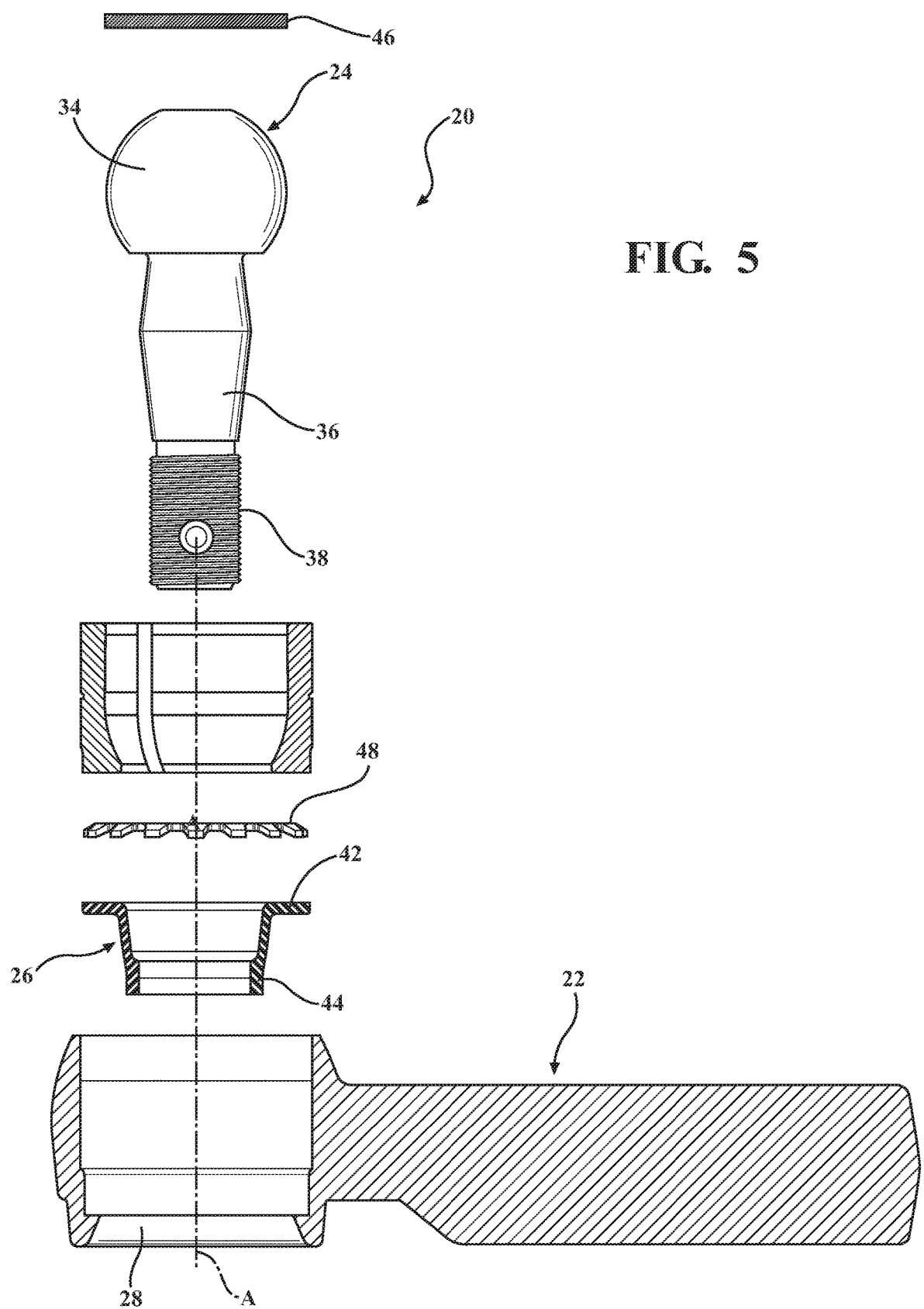
FIG. 5 is a cross-sectional and exploded view of the exemplary embodiment of the socket assembly.
Figure 6:
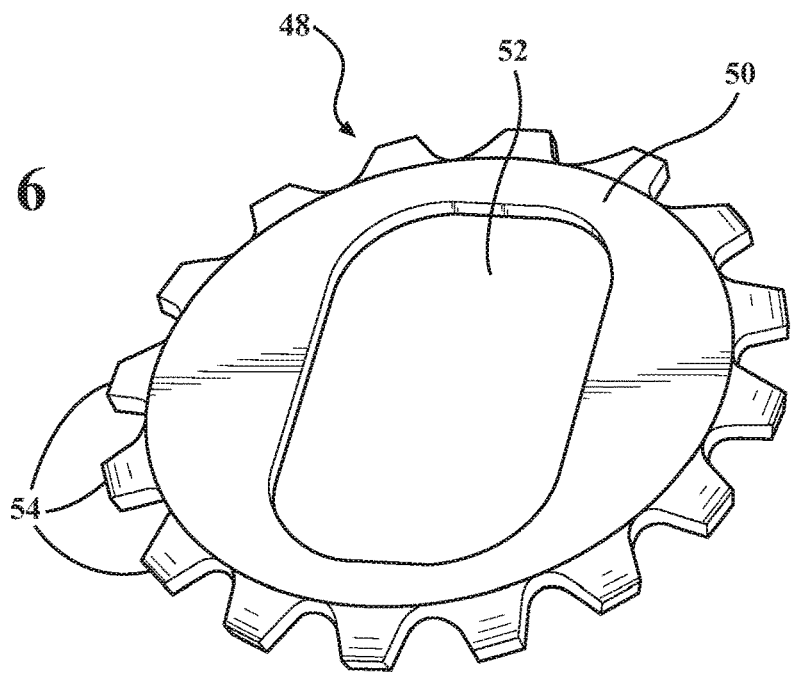
FIG. 6 is a perspective elevation view of an insert for the exemplary embodiment of the socket assembly.
Figure 7:
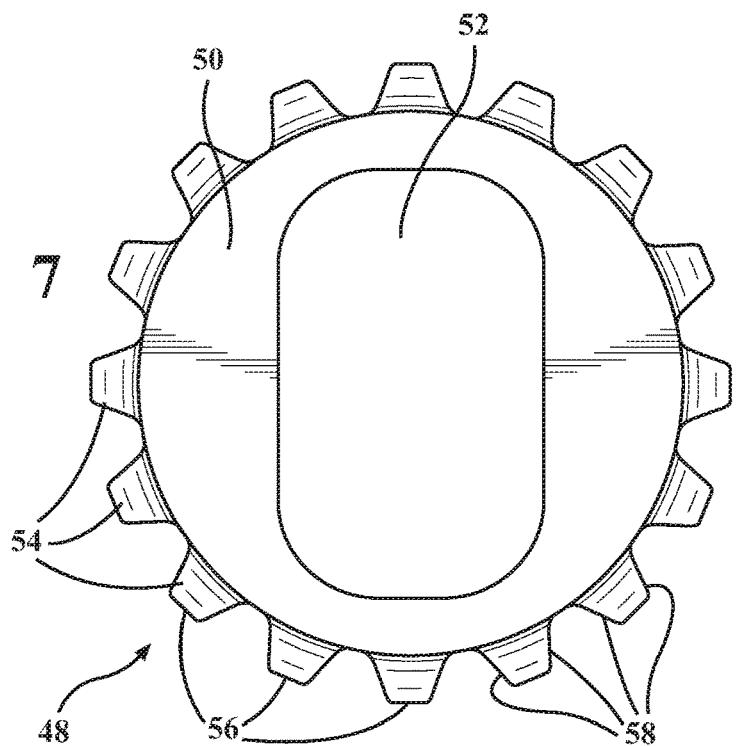
FIG. 7 is a top elevation view of the insert of FIG. 6.
Figure 8:
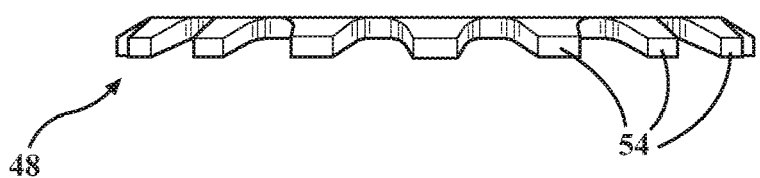
FIG. 8 is a front elevation view of the insert of FIG. 6.

As shown in FIGS. 2 and 5, the housing 22 has an inner surface that defines an inner bore, and the inner bore extends along a central axis A from an open first end 28 of the housing 22 to an open second end 30. Adjacent the open first end 28, the inner surface presents a lip 32 which extends radially inwardly towards the central axis A. In the exemplary embodiment, the lip 32 is machined into the inner surface of the housing 22. The housing 22 is preferably made as a single, monolithic piece of a metal, such as steel or an alloy steel. However, any suitable material may be employed.

In the exemplary embodiment, the ball stud 24 includes a ball portion 34 and a shank portion 36 which are integrally connected with one another. The ball portion 34 is received in the inner bore of the housing 22 and has a semi-spherically curved outer surface. The shank portion 36 extends along the central axis A from the ball portion 34, through the open first end 28, and to a threaded distal end 38. The ball and shank portions 34, 36 are preferably made as a single, monolithic piece of metal, such as steel or an alloy steel. However, any suitable material may be employed.

In the exemplary embodiment, a single-piece bearing 40 is disposed in the inner bore of the housing 22 between the ball portion 34 of the ball stud 24 and the inner surface of the housing 22. The bearing 40 has a semi-spherically curved bearing surface which is in surface-to-surface contact with the semi-spherically curved outer surface of the ball portion 34 of the ball stud 24 to allow the aforementioned free rotation and articulation of the ball stud 24 and the housing 22 relative to one another. The bearing 40 is preferably made of plastic or metal, and the curved bearing 40 surface preferably includes at least one lubricant groove for channeling a lubricant (such as grease) throughout the inner bore of the housing 22. It should be appreciated that the bearing 40 could take a range of different configurations and that two or more bearings could be disposed in the inner bore and in slidable contact with the ball portion 34 of the ball stud 24. It should be appreciated that two or more bearings could be included in the inner bore of the housing and the bearings for supporting opposite hemispheres of the ball portion of the ball stud.

The boot 26 is made as a single, monolithic piece of an elastomeric material, such as Neoprene or another rubber or a rubber-like material. The boot 26 extends along the central axis A from a first boot end 42 to a second boot end 44. The first boot end 42 is received within the open bore and is in sealed against the inner surface of the radially inwardly extending lip 32 of the housing 22, and the second boot end 44 is sealed against the shank portion 36 of the ball stud 24 outside of the inner bore of the housing 22. The first boot end 42 presents a radially outwardly extending flange 42 that is disposed axially between a lower end face of the bearing 40 and the radially inwardly extending lip 32 of the housing 22. The radially outwardly extending flange 42 has a lower surface which is in direct, surface-to-surface contact with the lip 32 of the housing 22.

An end cap 46 closes the open second end 30 of the housing 22 to capture the ball portion 34 and bearing 40 in the inner bore of the housing 22. In the exemplary embodiment, the end cap 46 is press-fit into a groove which is formed into the inner surface of the housing 22. However, it should be appreciated that the end cap 46 could be fixed with the housing 22 through any suitable means.

A ring-shaped insert 48 is disposed within the open bore and is sandwiched between the flange 42 of the boot 26 and the end face of the bearing 40. Referring now to FIGS. 2 and 6-8, the insert 48 has a generally planar base portion 50 that presents an opening 52 which surrounds the central axis A. In the inner bore of the housing 22, the shank portion 36 of the ball stud 24 extends through the opening 52. The insert 48 also presents a plurality of teeth 54 that extend radially outwardly from the planar base portion 50. The teeth 54 are spaced from one another in a circumferential direction, and each tooth 54 has an outer face 56 that extends circumferentially and a pair of side faces 58 that converge with one another from the base portion 50 to towards the outer face 56. The material thickness of the insert 48 is generally constant through the planar base portion 50 and the teeth 54. The insert 48 may be made through a punching and bending operation or through any suitable process or processes.

When the insert 48 is in a resting condition, the teeth 54 are angled relative to the planar base portion 50 such that each tooth 54 also extends axially towards the flange 42 of the boot 26. When the end cap 46 is installed onto the open second end 30 of the housing 22, the teeth 54 of the insert 48 are resiliently and elastically deformed such that internal stresses are imparted into the insert 48. The internal stresses bias the base portion 50 of the insert 48 against the bearing 40 to press the curved bearing 40 surface against the curved outer surface of the ball portion 34 of the ball stud 24 to remove any clearances between the bearing 40 and the ball portion 34.

Figure 4:
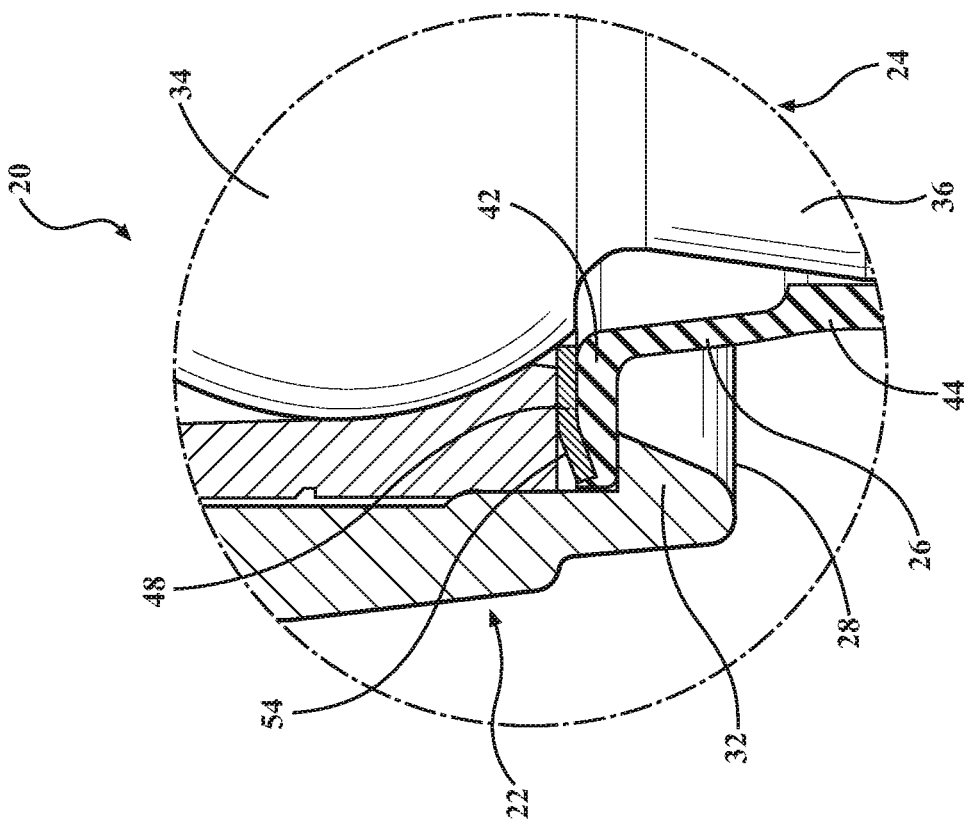
FIG. 4 is another enlarged cross-sectional view of the exemplary embodiment of the socket assembly and taken from a different perspective than FIG. 3.
Figure 3:
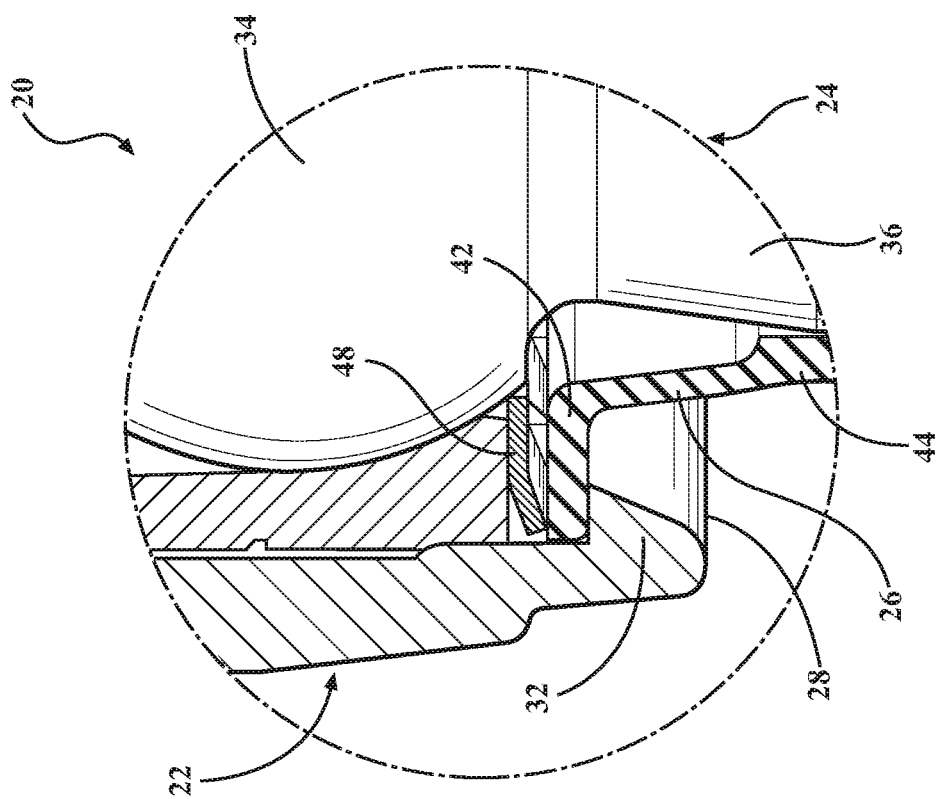
FIG. 3 is an enlarged view of a portion of the cross-sectional view of the cross-sectional view of FIG. 2.

As shown in FIG. 4, the internal stresses also bias the outer faces 56 of the teeth 54 against the flange 42 of the boot 26 such that the teeth 54 bite into portions 34, 36, 50 of the elastomeric material of the boot 26. In contrast, as shown in FIG. 3, in the gaps between the teeth 54, the elastomeric material of the booth is not compressed. The alternating compressed and uncompressed portions of the elastomeric material of the flange 42 has been found to provide an improved fluid-tight seal between the flange 42 of the boot 26 and the inner surface of the housing 22. In the exemplary embodiment, the teeth 54 are generally uniformly spaced from one another around the central axis A.

The opening 52 of the insert 48 has a generally rectangular, round or elliptical shape. In the exemplary embodiment, the opening 52 has two sets of parallel sides and rounded corners. This shape of the opening 52 restricts the range that the ball stud 24 and housing 22 are able to articulate relative to one another in one rotational direction in comparison to another rotational direction. As such, the insert 42 also restricts the motion in which the ball stud 24 and the housing 22 are able to articulate relative to one another. The insert 48 also protects the rubber material of the elastomeric boot 26 from being pinched or cut from contact with the metal ball stud 24 and the metal housing 22.

The insert 48 is preferably fabricated as a single, monolithic piece of an elastically deflectable material, such as spring steel. However, it should be appreciated that any suitable material can be employed.

Another aspect of the present invention is related to a method of making a socket assembly 20, such as the socket assembly 20 of FIGS. 1 and 2 and discussed above. The method includes the step of preparing the housing 22. The method proceeds with the step of inserting the elastomeric boot 26 into the inner bore through the second open end of the housing 22. The method continues with the step of inserting the insert 48 into the open bore of the housing 22 such that the insert 48 directly contacts the elastomeric boot 26. The method continues with the step of pressing the bearing 40 into the open bore of the housing such that the insert 48 is sandwiched between the elastomeric boot 26 and the bearing 40. The method continues with the step of inserting the ball portion 34 of the ball stud 24 into the bearing 40 through the second open end of the housing 22 such that the shank portion 36 extends out of the inner bore through the first open end of the housing 22. The method continues with the steps of sealing the first boot end 42 of the elastomeric boot 26 with the housing 22 and sealing the second boot end 44 of the elastomeric boot 26 against the shank portion 36 of the ball stud 24.

The method proceeds with the step of closing the second open end of the housing 22 with the end cap 46 to compress the insert 48 such that the teeth 54 of the insert 48 compress, or bite into, parts of the flange 42 of the elastomeric boot 26 to improve the seal between the first boot end 42 of the elastomeric boot 26 and the housing 22.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A socket assembly, comprising:
a housing with an inner surface that surrounds an inner bore which extends along a central axis;
a stud partially received in said inner bore of said housing and including a shank portion which extends out of said inner bore through an open end of said housing;
at least one bearing disposed in said inner bore of said housing and in slidable contact with said stud to allow said stud to at least one of articulate and rotate relative to said housing;
a boot made of an elastomeric material and extending from a first boot end that is sealed with said housing to a second boot end that is sealed with said shank portion of said stud;
said first boot end being received in said inner bore and sealed with said inner surface of said housing;
an insert fabricated as a separate piece from said boot and received in said inner bore of said housing between said at least one bearing and said first boot end;
said insert having an outer periphery which presents a plurality of teeth that extend radially outwardly and are spaced from one another in a circumferential direction, wherein said insert includes a generally planar base portion and said plurality of teeth extend radially outwardly from said base portion, and wherein said teeth are angled at an acute angle relative to said central axis and said planar base portion; and
said insert being compressed between said at least one bearing and said first boot end, biasing said planar base portion against said bearing to bias said bearing against said stud and causing said teeth to bite into said elastomeric material of said first boot end of said boot to form a seal between said first boot end of said boot and said inner surface of said housing.

2. The socket assembly as set forth in claim 1 wherein said first boot end of said boot presents a radially outwardly extending flange and wherein said inner surface of said housing presents a radially inwardly extending lip and wherein said radially outwardly extending flange of said boot is in direct, surface-to-surface contact with said radially inwardly extending lip of said housing.

3. The socket assembly as set forth in claim 1 wherein all of said teeth of said insert are angled relative to said planar base portion.

4. The socket assembly as set forth in claim 1 wherein said insert has an opening and wherein said shank portion of said stud extends through said opening.

5. The socket assembly as set forth in claim 4 wherein said opening is generally rectangular, round, or elliptical in shape.

6. The socket assembly as set forth in claim 1 wherein said stud is a ball stud with a ball portion that is disposed in said inner bore of said housing.

7. The socket assembly as set forth in claim 1 wherein said insert is biased into engagement with said at least one bearing and into engagement with said first boot end.

8. A method of making a socket assembly, comprising the steps of:
preparing a housing with in inner surface that surrounds an inner bore which extends along a central axis between an open first end and an open second end;
inserting a first boot end of an elastomeric boot into the inner bore of the housing;
inserting an insert into the inner bore of the housing, the insert having an outer periphery which presents a plurality of teeth that are spaced from one another in a circumferential direction, wherein the insert includes a generally planar base portion and wherein the plurality of teeth extend radially outwardly from the planar base portion and are angled relative to the base portion;
inserting a bearing into the inner bore of the housing;
inserting a portion of a stud into the inner bore of the housing into surface-to-surface contact with the bearing, the stud having a shank portion which extends out of the inner bore through the first end; and closing off the second end of the housing with an end cap and compressing the insert between the bearing and the first boot end, elastically deforming the insert to impart a biasing force on said planar base portion against the bearing to bias the bearing against the stud and causing the teeth of the insert to bite into parts of the first boot end of the elastomeric boot to form a seal between the first boot end of the elastomeric boot and the housing.

9. The method as set forth in claim 8 wherein the first boot end of the elastomeric boot presents a radially outwardly extending flange and wherein the inner surface of the housing presents a radially inwardly extending lip and wherein the radially outwardly extending flange of the elastomeric boot is in direct, surface-to-surface contact with the radially inwardly extending lip.

10. The method as set forth in claim 8 wherein all of the teeth are angled relative to the planar base portion.

11. The method as set forth in claim 8 further including compressing the insert against the bearing and against the first boot end while closing off the second end of the housing with the end cap.

\* \* \* \* \*